(No Model.)

L. M. WEAVER.
CORN CUTTER.

No. 543,517. Patented July 30, 1895.

Witnesses

Inventor
Loren M. Weaver
By his Attorneys,
C. A. Snow & Co.

United States Patent Office.

LOREN M. WEAVER, OF BETHEL, MICHIGAN.

CORN-CUTTER.

SPECIFICATION forming part of Letters Patent No. 543,517, dated July 30, 1895.

Application filed October 26, 1894. Serial No. 527,073. (No model.)

*To all whom it may concern:*

Be it known that I, LOREN M. WEAVER, a citizen of the United States, residing at Bethel, in the county of Branch and State of Michigan, have invented a new and useful Corn-Cutter, of which the following is a specification.

This invention relates to corn-cutters; and it has for its object to provide a new and useful machine of this character that shall be constructed with special reference to simplicity and strength, while at the same time for efficiency in operation, and one that can be easily controlled by one animal for cutting a single row at a time.

With these and other objects in view, which will readily appear as the nature of the invention is better understood, the same consists in the novel construction, combination, and arrangement of parts hereinafter more fully described, illustrated, and claimed.

Figure 1:
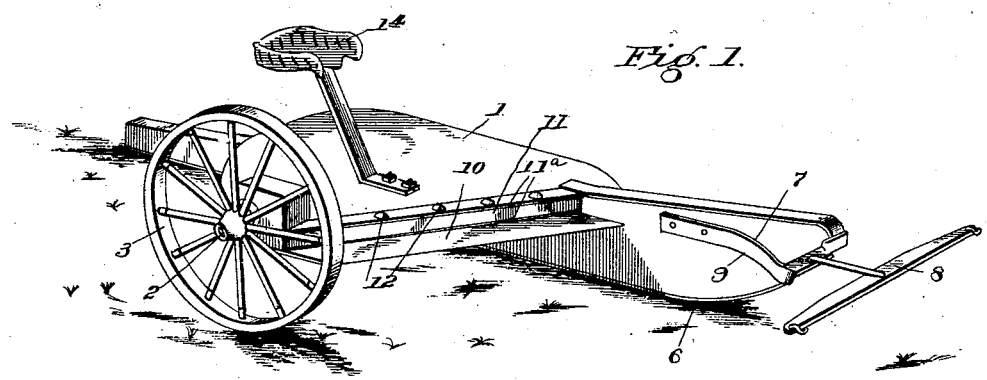
Figure 2:
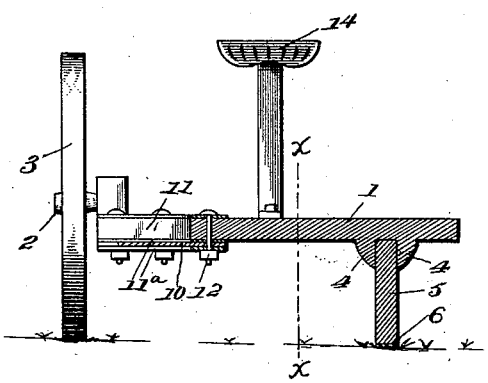
Figure 3:
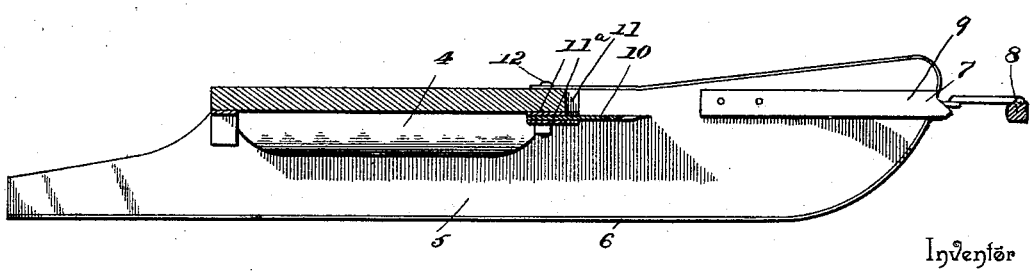

In the drawings, Figure 1 is a perspective view of a corn-cutter constructed in accordance with this invention. Fig. 2 is a transverse sectional view thereof. Fig. 3 is a longitudinal sectional view on the line $xx$ of Fig. 2.

Referring to the accompanying drawings, 1 designates a flat platform constructed of either wood or metal, and having attached to one side thereof an offstanding wheel-spindle 2, on which is journaled a side running-wheel 3, which provides means for supporting one side edge of the platform for travel over the ground, and near the side opposite the wheel 3 the platform 1 is provided on its under side with a pair of longitudinally-disposed attaching flanges 4, that embrace the upper edge of a single sled-runner 5. The single sled-runner 5 is suitably secured to the under side of the platform 1, near one side edge thereof, by means of bolts or other suitable fastening means, and said runner is of a greater length than the length of the platform and projects in front and in rear of the same in order to provide a firm support for the platform as it travels over the ground. The elongated single sled-runner 5 is preferably faced on its lower slide edge with a longitudinal facing-shoe 6 that serves to take up the wear and provides for the easy and smooth sliding of the runner over the ground. The runner 5 has attached to the extreme front end thereof an angular draft-bracket 7, that projects from the inner side of the runner, and is adapted to have connected to the front bar thereof the ordinary singletree 8, to which is hitched a single draft animal.

The angular draft-bracket 7, that is attached to the front end of the sled-runner 5, is provided with a curved inner-side portion 9, that may act in the capacity of a guide or guard to hold the runner at the side of the row being cut and to guide the corn to the inclined cutting-knife 10. The inclined cutting-knife 10 consists of a steel blade beveled to a cutting-edge at its front edge and arranged to extend between the inner side of the wheel 3 and the inner side of the runner 5, thereby completely occupying the space between the running-wheel and the sled-runner.

The inclined cutting-knife 10 is secured detachably to the front inclined edge 11 of the platform 1 by means of suitable bolts 12, and is therefore directly braced by the said platform, and suitable metal facing-strips 11$^a$ are arranged on the upper and lower sides of the platform at the front inclined edge thereof to strengthen the platform at this point and to receive the bolts that clamp the inclined knife in position. The platform 1 is also adapted to support an operator's seat 14, so that the operator can conveniently and comfortably control the animal and receive the corn as it falls onto the platform.

In operation the cutter is dragged along the ground, with the runner at one side of the row being cut and the wheel 3 at the opposite side of the row, so that the knife located intermediate of the runner and wheel will be carried against the corn and will cut the same down so that it will fall onto the platform, where it may be gathered for shocking by the operator in the usual way.

Changes in the form, proportion, and the minor details of construction may be resorted to without departing from the principle or sacrificing any of the advantages of this invention.

Having thus described the invention, what is claimed, and desired to be secured by Letters Patent, is—

1. In a corn cutter, a flat platform provided at one side with a wheel spindle, a side running wheel mounted on the wheel spindle, a single slide runner attached to the platform opposite the wheel, said single slide runner being sufficiently long to extend a distance in front and in rear of the platform and thereby disposing the wheel at a point intermediate between the ends of the runner, a cutting knife attached to the platform and extending across the space between the wheel and the runner, and a draft attachment connected with the front end of the runner, substantially as set forth.

2. In a corn cutter, a flat platform provided at one side with an offstanding wheel spindle, a pair of longitudinally disposed flanges projected from its under side near the side edge opposite the wheel spindle, and with an inclined front edge, a side running wheel mounted on the spindle, a single slide runner attached to the under side of the platform between the flanges thereof and of a greater length than the platform, an inclined cutting knife arranged at the inclined front edge of the platform, metal facing strips arranged on the upper and lower sides of the platform at the inclined front edge, and bolts passed through the platform, knife, and facing strips, substantially as set forth.

In testimony that I claim the foregoing as my own I have hereto affixed my signature in the presence of two witnesses.

LOREN M. $\overset{\text{his}}{\times}$ WEAVER.
mark

Witnesses:
G. A. NICHOLS,
BENJ. B. GORMAN.